United States Patent [19]
Sherry

[11] Patent Number: 5,337,982
[45] Date of Patent: Aug. 16, 1994

[54] APPARATUS AND METHOD FOR CONTROLLING THE VERTICAL PROFILE OF AN AIRCRAFT

[75] Inventor: Lance Sherry, Phoenix, Ariz.

[73] Assignee: Honeywell Inc., Minneapolis, Minn.

[21] Appl. No.: 774,776

[22] Filed: Oct. 10, 1991

[51] Int. Cl.$^5$ .......................... G05D 1/10; G06G 7/70; B64C 13/18
[52] U.S. Cl. ..................................... 244/186; 244/177; 244/194; 244/195; 364/430; 364/433; 318/583
[58] Field of Search ............... 244/177, 181, 185, 186, 244/187, 194, 195; 364/428, 429, 430, 433, 435; 318/583, 584

[56] References Cited
U.S. PATENT DOCUMENTS

| | | |
|---|---|---|
| 3,691,356 | 9/1972 | Miller . |
| 3,980,258 | 9/1976 | Simeon ................................ 318/584 |
| 4,029,271 | 6/1977 | Murphy et al. ...................... 244/186 |
| 4,092,716 | 5/1978 | Berg et al. ............................ 244/195 |
| 4,377,848 | 3/1983 | Flannigan et al. . |
| 4,460,964 | 7/1984 | Skutecki et al. ..................... 244/177 |
| 4,471,439 | 9/1984 | Robbins et al. . |
| 4,536,843 | 8/1985 | Lambregts . |
| 4,837,695 | 6/1989 | Baldwin . |
| 4,980,833 | 12/1990 | Milligan et al. . |
| 5,070,458 | 12/1991 | Gilmore ............................... 244/194 |
| 5,233,524 | 8/1993 | Jackson ................................ 364/428 |

*Primary Examiner*—Michael S. Huppert
*Assistant Examiner*—Virna Lissi Ansley
*Attorney, Agent, or Firm*—Arthur A. Sapelli; Dale E. Jepsen; Ronald E. Champion

[57] ABSTRACT

In an aircraft, there is included a Flight Management System (FMS), Autopilot and Autothrottle for controlling the aircraft. The apparatus has a plurality of outputs for definition of the real-time targets, controlled by the Autopilot and Autothrottle, to guide the vertical position of the aircraft to a desired vertical position along the desired vertical flightplan (or profile) according to a set of operational procedures. The FMS includes an apparatus that comprises an element which provides information denoting actual vertical position of the aircraft, and an element which generates information specifying the desired vertical position of the aircraft along the predetermined desired flightplan. Further, the apparatus determines the actual vertical position and desired vertical position to generate the real-time targets and modes for the Autopilot and Autothrottle, to achieve the predetermined desired flightplan from takeoff climb-out, through terminal-area and enroute area climb, cruise, descent and initial approach. This processor apparatus includes a unique decision construct control law to automate the selection of the appropriate operational procedure and the subsequent determination of the targets and modes.

10 Claims, 6 Drawing Sheets

APPARATUS AND METHOD FOR CONTROLLING THE VERTICAL PROFILE OF AN AIRCRAFT

BACKGROUND OF THE INVENTION

The present invention relates to an aircraft Flight Management System (FMS), and more particularly, to an apparatus for controlling the vertical profile of a flight plan of the aircraft.

Integrated Flight Systems of todays modern commercial aircraft are operated under the jurisdiction of a Flight Management Computer and a conventional Autopilot and Autothrottle, well known to those skilled in the art. The Flight Management Computer identifies the correct route (flightplanning), identifies current aircraft position (navigation), and selects aircraft altitude, speed, vertical speed, thrust and heading such that the aircraft follows the desired route (guidance). The conventional Autopilot dynamically adjusts the aircraft control surfaces and throttles to maintain the guidance targets (control).

The FMS performs the task of flightplanning by compiling a four-dimensional route, defined by a Lateral Flightplan, a Vertical Flightplan and an Elapsed Time Trajectory. These flightplans are compiled from stored Navigation Data Bases and flight-crew entries. The FMS performs the task of navigation by identifying aircraft position relative to fixed points on the surface of the earth. A lateral position, vertical position and elapsed time are computed by a combination of data from ground-based transponding radios, radar, and aircraft motion sensors. The FMS performs the task of guidance by determining the appropriate altitude, speed, thrust, and heading required to maintain the current leg of the flightplan. These targets are determined by a comparison of aircraft position (navigation) to the desired profile (flightplanning) and may take into account temporary deviations from the flightplan due to weather, traffic equipment failure or on-board emergencies. The Autopilot controls the aircraft by adjusting the pitch, roll and yaw control surfaces and the throttle position, to instantaneously maintain the desired aircraft trajectory defined by FMS guidance.

The existing Flight Management Systems have successfully automated the flightplanning, navigation, lateral guidance and control tasks. The exception, the task of vertical guidance (i.e., the FMS control of the vertical profile) has not been included in the FMS control.

The successful automation of the flightplanning, navigation, lateral guidance and control tasks can be attributed to the existence of explicit and comprehensive procedures, rules and equations that describe the necessary computations or desired aircraft behavior for lateral guidance (delineated in ARINC Specifications and FAA Advisory Circulars). These procedures, rules and equations, applied in a coordinated manner by Air Traffic Control (ATC) and flight-crews, can be used to generate properly functioning algorithms for implementation in automated systems.

By analogy, the lack of success in the automation of the vertical guidance task can be attributed to the absence of explicit, comprehensive and universally accepted procedures for flight management of the vertical profile. The absence of these procedures, is evident in the lack of coordination between ATC, flight-crews and the semi-automated systems that require flight-crew intervention, and results in an increase in cockpit workload. In addition, the existing automated systems (built based on an incomplete set of procedures and using the nested if-then-else algorithms of conventional structured programming) are difficult to design, unmanageable, and difficult to modify (to support evolving designs) with integrity.

The present invention relates to an improved apparatus for the automation of vertical guidance that overcomes the drawbacks of existing systems by:
1) the creation of a comprehensive and universally acceptable set of procedures (known as Vertical Guidance Operational Procedures) for flight management of the vertical profile by Air Traffic Control, flight-crews and system design engineers, and
2) the automation of the Vertical Guidance Operational Procedures via a unique set of control law algorithms that utilize the techniques of closed-loop feedback and a knowledge-based decision construct. (These operational procedures represent a collation of international airspace regulations, air traffic control policies, airline/flight-crew policies and the operational limits of the aircraft.)

The vertical plane (i.e., the vertical profile of an aircraft or vertical axis control) may be considered as having two dimensions, altitude (up/down) and time (speed). The vertical profile of the aircraft is controlled via the elevators and the engines—the pitch (up/down) components and thrust components, respectively. In present day systems, the throttle (thrust) provides one trajectory for the vertical control function, and the elevators provide another trajectory for the vertical control function. Generally, the control functions of these present day systems are being performed in a serial fashion and often times these control functions are said to be coupled, and oppose one another.

Thus, there is a need to coordinate the elevator/throttle control. The present invention selects targets and control modes such that the elevator control and the throttle control are coordinated thereby resulting in an integrated control of the vertical flight profile, i.e., of the elevator command and the throttle command.

SUMMARY OF THE INVENTION

Thus there is provided by the present invention, an apparatus for providing coordinated control of an aircraft in the vertical plane (i.e., the vertical profile). In an aircraft, there is included a Flight Management System (FMS), Autopilot and Autothrottle for controlling the aircraft. The apparatus having plurality of outputs for definition of the real-time targets, controlled by the Autopilot and Autothrottle, to guide the vertical position of the aircraft to a desired vertical position along the desired vertical flightplan (or profile) according to a set of operational procedures specified to take into account international airspace regulations, air traffic control policies, airline/flight-crew policies, and the operational limits of the aircraft. The FMS includes an apparatus that comprises an element which provides information denoting actual vertical position of the aircraft, and an element which generates information specifying the desired vertical position of the aircraft along the predetermined desired flightplan. Further, the apparatus includes a processor to process the actual vertical position and desired vertical position to automatically determine, in accordance with the predefined decision construct control law and without flight-crew intervention, the real-time targets and modes for the Autopilot and Autothrottle, to achieve the predetermined desired flightplan from takeoff climb-out, through terminal-area and enroute area climb, cruise, descent and initial approach. This processor apparatus includes a unique decision construct control law to automate the selection of the appropriate operational procedure and the subsequent determination of the targets and modes, based on sets of rules that collate the procedures of international airspace regulations, air traffic control policies, airline/flightcrew policies, and the operational limits of the aircraft.

Accordingly, it is an object of the present invention to provide an apparatus for coordinating the control functions of an aircraft in the vertical plane.

It is another object of the present invention to provide an apparatus for coordinating the elevator control and the thrust control functions of an aircraft in the vertical plane.

It is still another object of the present invention to provide an apparatus for coordinating the control functions of an aircraft in the vertical plane according to a set of operational procedures.

It is yet another object of the present invention to provide an apparatus for coordinating the control functions of an aircraft in the vertical plane according to a set of operational procedures that represent international airspace regulations, air traffic control policies, airline/flight-crew policies and the operational limits of the aircraft without flight-crew intervention.

It is a further object of the present invention to provide an apparatus for coordinating the elevator control and the thrust control functions of an aircraft in the vertical plane according to a set of operational procedures that represent international airspace regulations, air traffic control policies, airline/flight-crew policies, and the operational limits of the aircraft without filght-crew intervention.

These and other objects of the present invention will become more apparent when taken in conjunction with the following description and attached drawings, wherein like characters indicate like parts, and which drawings form a part of the present application.

DETAILED DESCRIPTION

Figure 1:
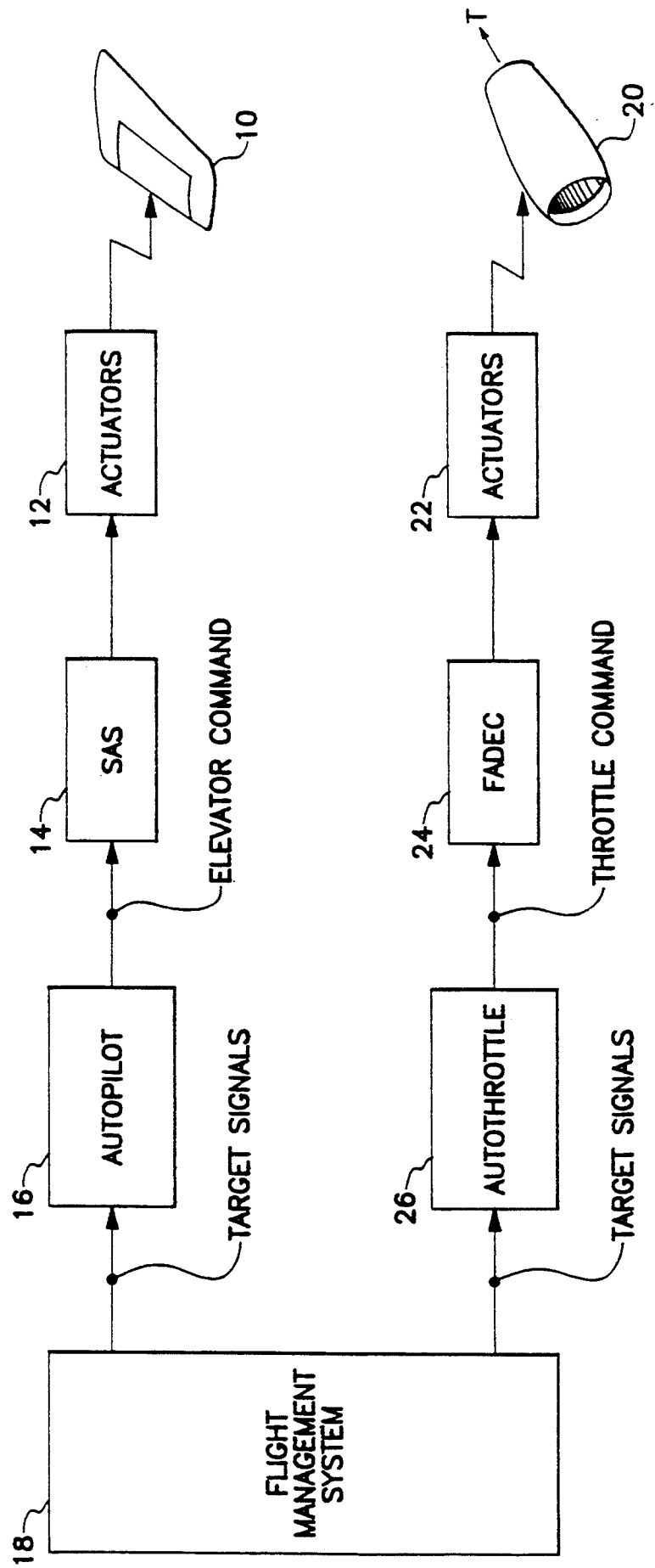
FIG. 1 shows a block diagram of a typical aircraft vertical axis controller systems of the prior art.

Before describing the present invention it will be helpful for an understanding of the present invention to describe existing systems. Referring to FIG. 1 there is shown a block diagram of a typical aircraft vertical guidance control (sometimes referred to as vertical axis control). The vertical profile of an aircraft (A/C) may be considered as having two dimensions, altitude (up/down) and time (speed). The vertical profile of the aircraft is controlled via elevators and engines—the pitch (up/down) component and the thrust component, respectively. An elevator 10 of an aircraft is driven by an actuator 12 via a link (hydraulic, electric, mechanical, ...). The actuator 12 is in turn driven by a Stability Augmentation System (SAS) 14. An autopilot 16 generates electronic command signals which are coupled to the SAS 14. The actuators 12 are generally hydraulic and the SAS 14 accounts for the non-linearities of the actuator and the non-linearities of the dynamics of the aircraft. The electronic signal generated by the autopilot 16 is the elevator command which the SAS 14 utilizes to generate actuator commands. The autopilot is driven by an electronic signal (targets/control mode) from a Flight Management System (FMS) 18. The intelligence of the system is in the Flight Management System 18, which automates flight-crew commands by indicating when to climb, when to remain level and how to perform the climb, via the electronic signals, i.e., the target signals. The other control dimension, the thrust (T) of the engine 20, is driven by an actuator 22 which is in turn driven by a FADEC 24 (Full Authority Digital Electronic Controller). An autothrottle 26 generates an electronic signal (throttle command) which is coupled to the FADEC 24. The autothrottle 26 receives target signals from the FMS 18 for generating the throttle command.

Figure 2:
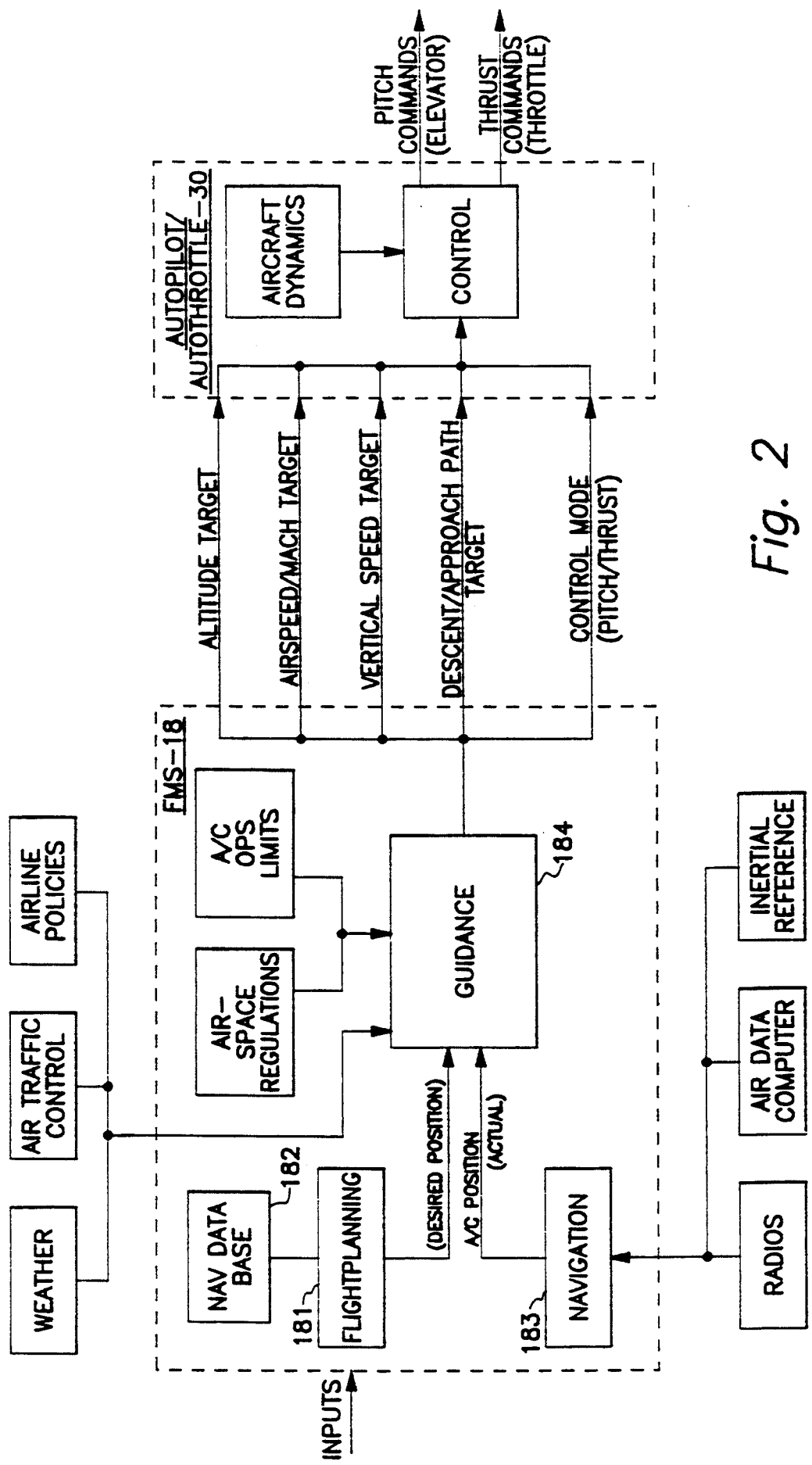
FIG. 2 shows a functional block diagram of a typical Flight Management System (FMS)of the prior art.

Referring to FIG. 2 there is shown a functional block diagram of a Flight Management System (FMS) 18. Flightplanning logic 181 compiles a four-dimensional route, by a lateral flight plan, a vertical flight plan, and an elapsed time trajectory from an inputted flight plan. These flight plans are compiled from stored navigation database 182 and flight crew inputs. During the flight, the navigation system 183 identifies the aircraft position relative to fix points to the surface of the earth. A lateral position, vertical position, and elapsed time are computed by a combination of data from ground based transponding radios, radar, and aircraft motion sensors. A guidance system 184, connected to the navigation system 183 and the flightplanning logic 181, determines (via a flight management computer, not shown) the appropriate altitude, speed, thrust, and heading target (or setting) required to maintain the current leg of the flight plan. These output parameters (targets) are determined by a comparison of an actual aircraft position to the desired position determined by the flightplanning logic 181, and further takes into account temporary deviations from the flight plan due to weather, traffic, equipment failures, or on board emergencies. The guidance system 184, which embodies Airspace Regulations and the operational limits of the aircraft, outputs 4 target signals, altitude target, airspeed/mach target, vertical speed target, and decent/approach path target, to an autopilot/autothrottle 30 (sometimes referred to herein as simply autopilot 30). In addition, the guidance system outputs a control mode signal which identifies to the autopilot 30 which parameter the throttle is required to control and which parameter the elevator is required to control. The autopilot 30 controls the aircraft by adjusting the pitch, roll, and yaw control surfaces and the throttle position to maintain the desired aircraft trajectory defined by the guidance system 184. Of particular interest here is adjusting the elevators 10 and engines (thrust) 20 to control the vertical profile.

Figure 3:
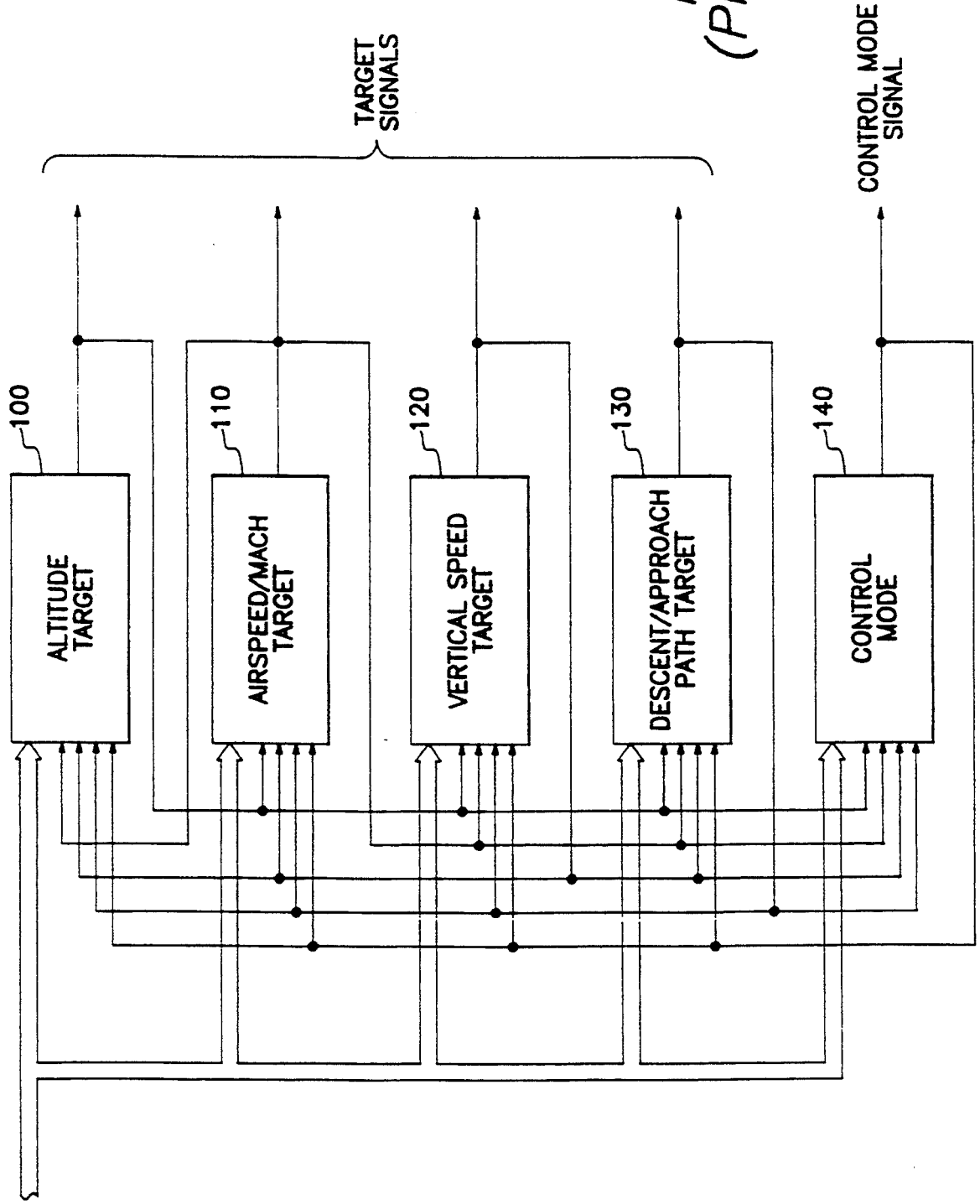
FIG. 3 shows a flow diagram of the control function of the prior art.

Referring to FIG. 3 there is shown a flow diagram of the guidance function of the prior art. The controlling apparatus of the Flight Management System of the prior art was organized to include a sequence of equations/algorithms and supporting logic which generated an altitude target 100 and outputted that parameter. Then an airspeed/mach target 110 was computed, a vertical speed target 120 was generated and then a decent/approach path target 130 was generated, each target being outputted upon completion of the calculation. A separate calculation was performed to generate a control mode signal 140. In this prior art system using the breakout as shown the altitude target is required as an input to the airspeed target calculation. In addition the airspeed target calculation is required for the control mode computation. Thus far, the design is relatively reasonable and straight forward, the targets being calculated in a serial fashion. However the airspeed target result is utilized as an input to the altitude target calculation. Thus, a situation exists in which a first process is driving a second process and the output of the second process is used to drive the first process (and other processes), which changes the original input to the first process. Therefore, it can be seen that this structure/organization has some inherent short comings. In the prior art additional software is included to help alleviate these shortcomings, but the additional software does not cover all cases and is not an optimal solution. As a result of the overall complexity in development of prior art system, the level of automation has been minimal requiring constant flight-crew attention to achieve the desired operational behavior. The present invention is structured differently to avoid the shortcomings described above, and will now be described.

The present invention defines a set of Vertical Guidance Operational Procedures (VGOpProc) for the flight management of the vertical profile. This set of procedures represents the necessary maneuvers required by the Air Traffic Controller (ATC) international airspace regulations, flight crew procedures, and aircraft operational limits, to manage the aircraft trajectory in the vertical profile. The combination of all the regulations generate the set of VGOpProc required to manage the vertical profile includes:

Takeoff-Climb-Out/Go Around Climb-Out Operational Procedure
Climb Operational Procedure
Climb Intermediate Level Operational Procedure
Cruise Operational Procedure
Profile-Descent Operational Procedure
Descent Intermediate Level Operational Procedure
Late Descent Operational Procedure
Early Descent Operational Procedure
Airmass-Descent Operational Procedure Each VGOpProc includes an associated set of attributes; namely, Objectives/Strategies, Engagement Criteria, Altitude Target, Control Mode, Speed Target, Vertical Speed Target, and Descent/Approach Profile.

The Objectives/Strategies of a Vertical Guidance Operational Procedure represent the goals, manner of operation, or the specific maneuver that can be achieved by this procedure. This attribute distinguishes one Operational Procedure from another. The Engagement Criteria identify aircraft position in the vertical flightplan or the state of the aircraft, when the Operational Procedure shall be invoked. Engagement Criteria takes into account pilot instructions from the Flight Control Panels, equipment status, and the position of the aircraft relative to the desired vertical flightplan. The Altitude Target identifies the level altitude that shall be maintained or acquired by the aircraft to satisfy the objectives of the procedure. The altitude target, determined by the selection of one of the Altitude Scenarios, may be the pilot selected Clearance Altitude or an altitude constraint specified in the vertical flightplan. The Control Mode identifies the parameters that shall be acquired and maintained by the integrated pitch/thrust Control Mode. The attributes of the control modes include the methods for computation of the elevator and throttle commands (typically closed-loop feedback with the predictive term) and the control error criterion specified by the Advisory Circulares of the Federal Aviation Administration (FAA). The Control Mode is determined by the selection of one of the Control Mode Scenarios, may be any one of the pitch/thrust combinations available in the Autopilot. The Speed Target identifies the airspeed and mach targets that shall be acquired and maintained to satisfy the objectives of the procedure. The airspeed and mach targets, determined by the selection of one of the Speed Scenarios, may be pilot selected Airspeed or Mach from the Flight Control Panel, an optimum speed defined by the FMS, or a speed specified in the vertical flightplan. The Vertical speed Target identifies the rate of descent that shall be acquired and maintained in order to satisfy the objectives of the procedure. The vertical speed targets, determined by the selection of one of the Vertical Speed Scenarios, may be the pilot selected Vertical speed from the Flight Control Panel, or a rate of descent identified for a specific procedure.

The Descent/Approach Profile identifies the altitude and altitude rate trajectory of the FMS computed Vertical Flightplan that shall be acquired and maintained to satisfy the objectives of the procedure. These trajectories may be defined for the conventional Autopilot by an earth-referenced Flight Path Angle. These VGOp and their associated attributes are detailed in Appendix-A, pages A0–A9.

The first part of the present invention, the defining of the set of vertical guidance operational procedures (VGOpProc), has been described above. The second part, the automation of the VGOpProc of the preferred embodiment of the present invention, will now be discussed.

Figure 4:
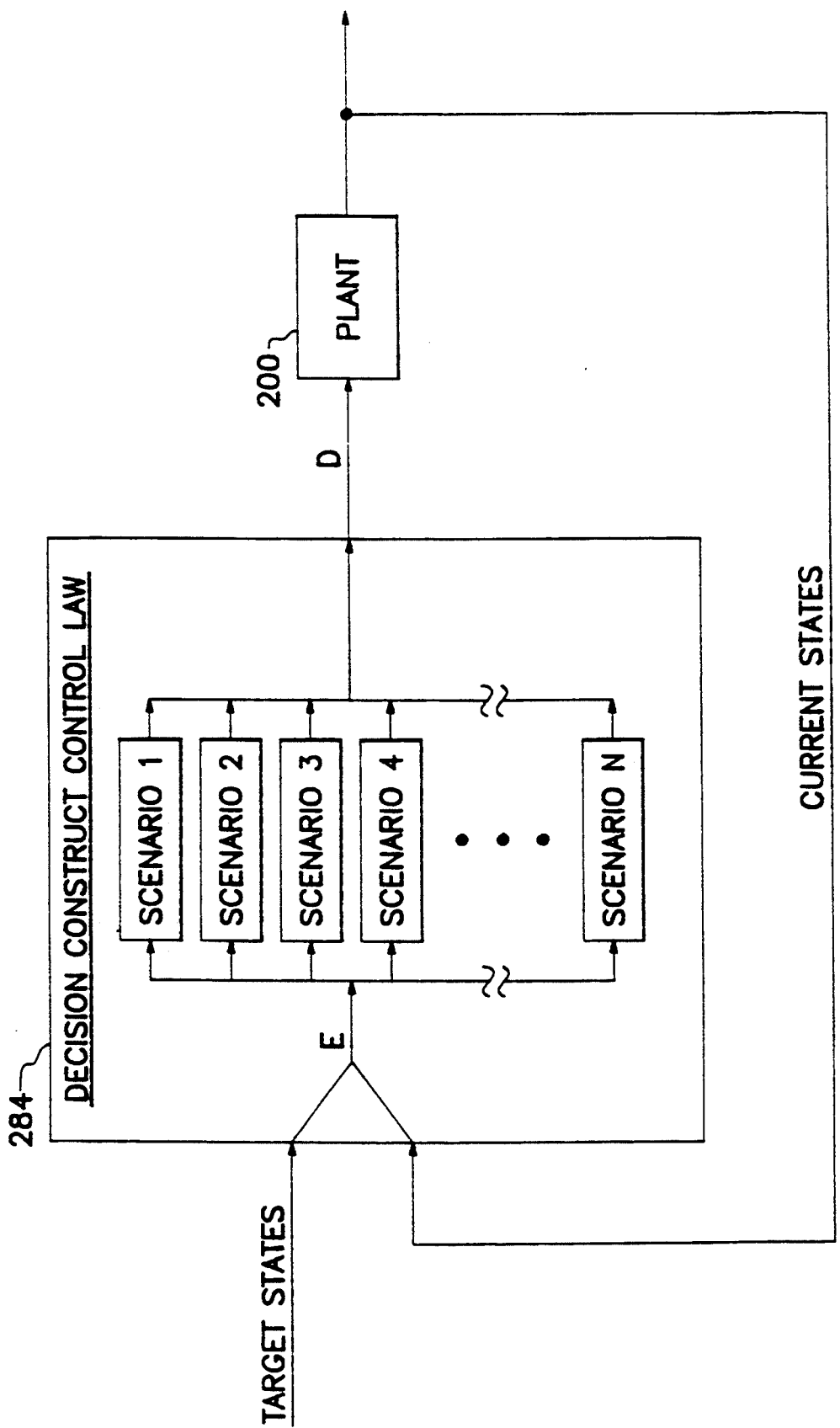
FIG. 4 shows a generalized block diagram of a feedback control loop of the present invention including the decision construct control law.
Figure 5:
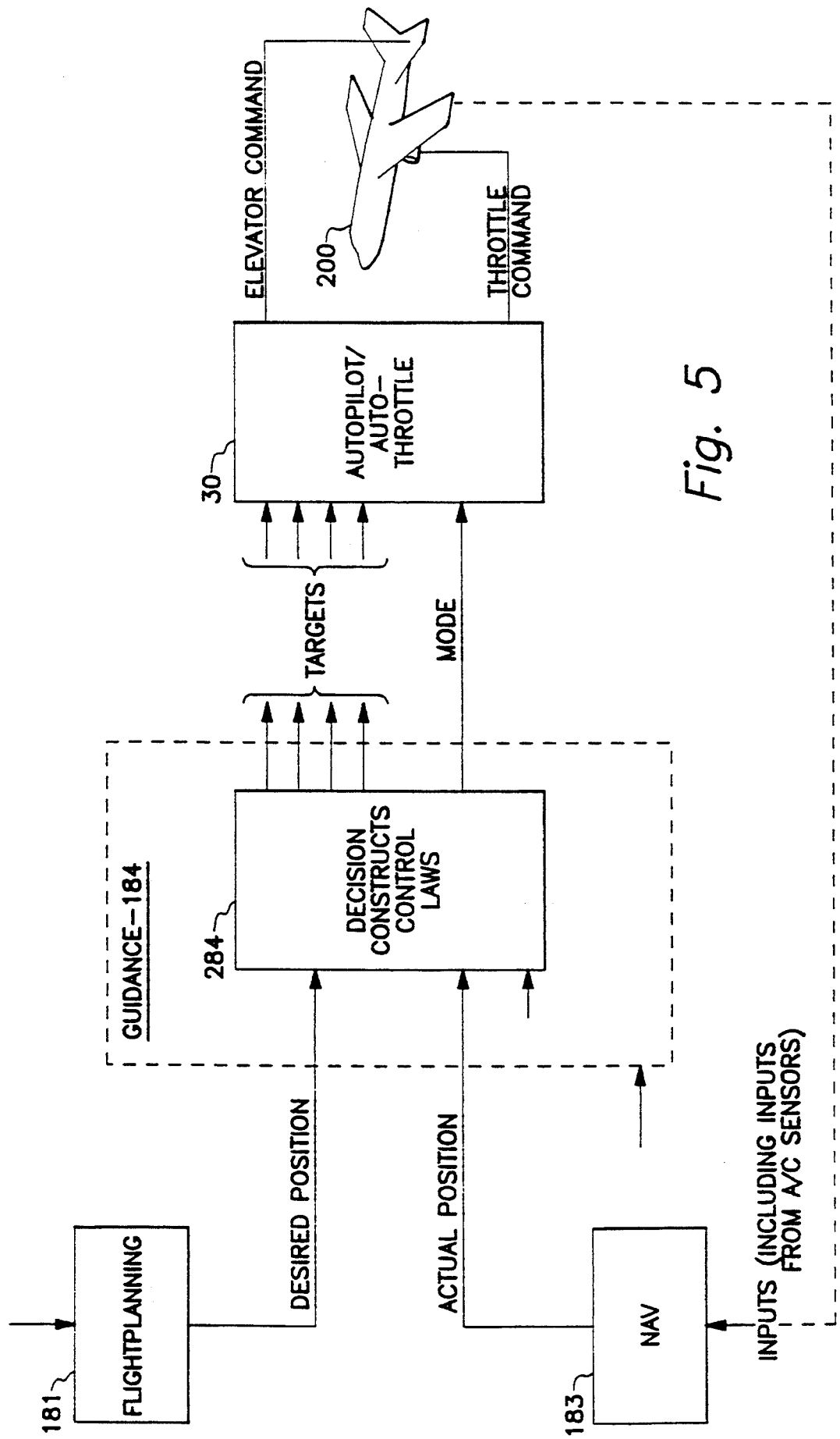
FIG. 5 shows a block diagram of the feedback control system for controlling vertical axis of the preferred embodiment of the present invention.

In the preferred embodiment of the present invention the VGOpProc are implemented in a "decision construct" control law in a closed-loop feedback control system. Referring to FIG. 4 there is shown a generalized block diagram of the feedback control loop of the present invention including the decision construct control law (i.e., logic). A controller 284 has a desired input (target states) and an actual input (current states) fed into the controller 284. The actual position and desired position are combined to generate and error signal E and inputted to the logic of the controller 284. The controller outputs a drive signal D which is coupled to a plant 200 such that the plant is driven to the desired state. The output of the plant indicates the current status which is the signal feedback into the controller 284. In the present invention the controller 284 implements the "Decision Construct Control Laws" utilized to generate the drive signal D. In the present invention the plant is the aircraft, and more particularly, the vertical guidance portion which includes the elevators 10 and throttle 20. The controller of the present invention is included in the Flight Management System, and more particularly, to the guidance portion 184 of the Flight Management System 18. FIG. 5 shows a block diagram of the control system of the preferred embodiment of the present invention for controlling the vertical guidance utilizing the Decision Construct Control Laws in a feedback control loop. The autopilot/auto throttle 30, and the SAS, FADEC, and actuators (not shown) comprise controllers, and the elevators, thrust comprise the control elements of the preferred embodiment of the present invention.

Figure 6:
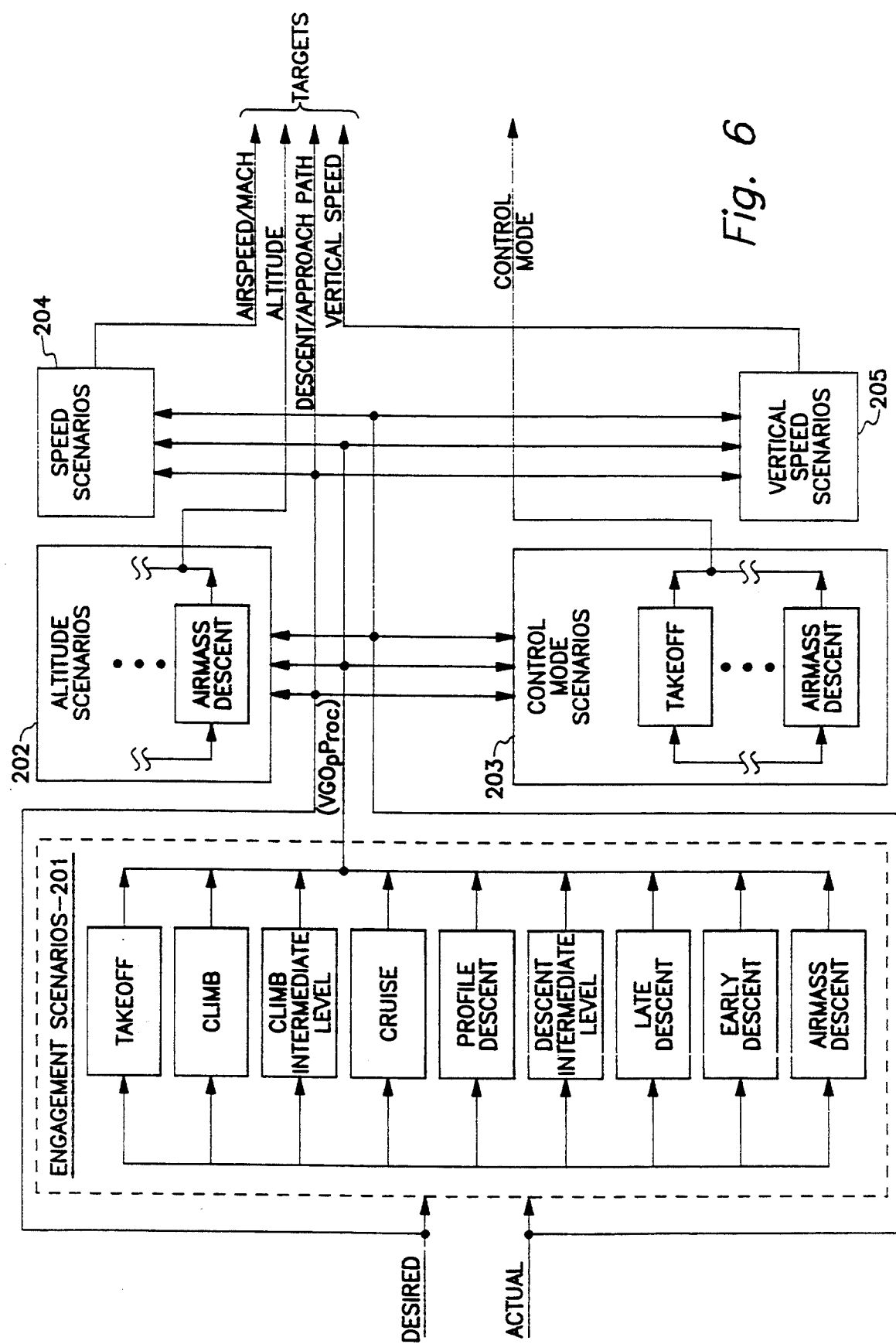
FIG. 6 shows an information logic flow of the hierarchy of the decision constructs.

Referring to FIG. 6, there is shown an informational flow of the hierarchy of the Decision Constructs Control Laws included in the controller 284. In the preferred embodiment of the present invention, five sets of Decision Construct Control Laws are defined, engagement, altitude, control mode, speed, and vertical speed, 201–205. Each Decision Construct Control Law includes logical control law (scenario) for the nine procedures identified above associated with each Decision Construct. The desired position of the aircraft (the Vertical Flight Plan) is inputted to the controller 284, along with the actual position of the aircraft, i.e., the position as determined by the navigational system of the aircraft. The desired position and actual position are also inputted to each scenario. By comparing the desired and actual positions, the engagement scenario logic 201 can determine which procedure is to be selected, VGOpProc, and is inputted to each of the other four scenarios, 202–205. Based on the inputs, desired position, actual position, and procedure, the logic of the remaining scenarios 202–205 determine the four target signals and the control mode, the targets being the airspeed/mach, altitude, descent/approach path and vertical speeds targets. Appendix B shows the logic equations of the control law for the engagement criteria. It will be recognized by those skilled in the art that the decision construct control laws of the present invention can be implemented in a variety of ways, including digital logic, semiconductor logic, relay logic, boolean logic, microprocessors, sequencers, software, . . . .

Therefore, the present invention determines the target signals for control of the vertical profile in a parallel manner (essentially simultaneously) rather than the serial fashion of existing systems. In the present invention, the rules for vertical guidance are effectively standardized and the implementation of the these rules is automated to enable increased complexity of the systems.

While there has been shown what is considered the preferred embodiment of the present invention, it will be manifest that many changes and modifications can be made therein without departing from the essential spirit and scope of the invention. It is intended, therefore, in the annexed claims to cover all such changes and modifications which fall within the true scope of the invention.

APPENDIX- A

Vertical Guidance Operational Procedure: Takeoff/Go Around

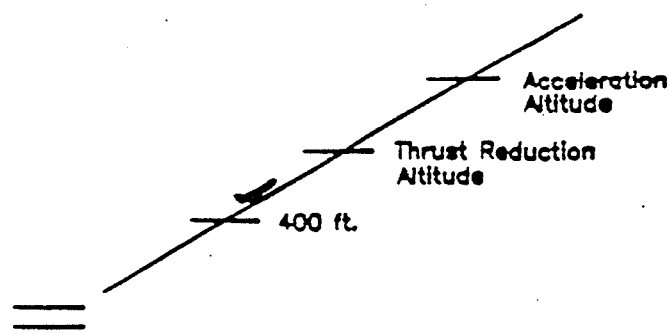

Objectives/Strategy:

Airmass-referenced ascent with takeoff restrictions.

Engagement Criteria:

The Operational Procedure shall be engaged for any of the following Engagement Scenarios:

(a) Takeoff - Aircraft is above 400 ft AGL and below the Acceleration Altitude
(b) Go Around - Aircraft is above 400ft AGL and below the Acceleration Altitude

Integrated Pitch/Thrust Control Mode:

The Pitch/Thrust Control Mode shall be selected according to the following Control Mode Scenarios:

(a) Takeoff/Go Around - TOGA Speed/Max-thrust

Altitude Target:

The Altitude Target shall be selected according to the following Altitude Scenarios:

(a) Climb to Clearance Altitude
(b) Climb to Vertical Flightplan Altitude Constraint

Speed Target:

The Airspeed Target and Mach Target shall be selected according to the following Speed Scenarios:

(a) Takeoff - $V_2 + X$
(b) Go Around - Current Airspeed limited to Vmin

Vertical Speed Target:

Not Applicable

Descent/Approach Profile:

Not Applicable

Vertical Guidance Operational Procedure: Climb

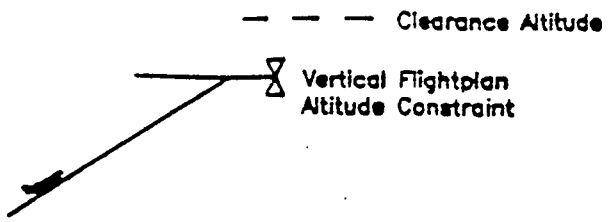

Objectives/Strategy:

Airmass-referenced ascent.

Engagement Criteria:

The Operational Procedure shall be engaged for any of the following Engement Scenarios:

(a) Climb - Aircraft above acceleration altitude.

Integrated Pitch/Thrust Control Mode:

The Pitch/Thrust Control Mode shall be selected according to the following Control Mode Scenarios:

(a) Climb - Speed/Max-thrust.

Altitude Target:

The Altitude Target shall be selected according to the following Altitude Scenarios:

(a) Climb to Clearance Altitude
   (b) Climb to Vertical Flightplan Altitude Constraint

Speed Target:

The Airspeed Target and Mach Target shall be selected according to the following Speed Scenarios:

(a) Econ Climb CAS/Mach Schedule
   (b) Edit Climb CAS/Mach Schedule
   (c) Max Angle Climb CAS
   (d) IAS/Mach Select/Preselect
   (e) Hold CAS (for hold with manual termination)

Vertical Speed Target:

Not Applicable

Descent/Approach Profile:

Not Applicable

Vertical Guidance Operational Procedure: Climb Intermediate Level

Objectives/Strategy:

Earth-referenced level flight at the Clearance Altitude or Vertical Flightplan Altitude Constraint Engagement Criteria:

The Operational Procedure shall be engaged for any of the following Engagement Scenarios:

(a) Acquisition of Level - Aircraft is capturing or maintaining level flight

Integrated Pitch/Thrust Control Mode:

The Pitch/Thrust Control Mode shall be selected according to the following Control Mode Scenarios:

(a) Acquisition of Level - Altitude Capture/Speed
   (b) Maintaining Level - Altitude Hold/Speed Altitude Target:

The Altitude Target shall be selected according to the following Altitude Scenarios:

(a) Level at Clearance Altitude
   (b) Level at Vertical Flightplan Altitude Constraint Speed Target:

The Airspeed Target and Mach Target shall be selected according to the following Speed Scenarios:

(a) Econ Climb CAS/Mach Schedule
   (b) Edit Climb CAS/Mach Schedule
   (c) Max Angle Climb CAS
   (d) IAS/Mach Select/Preselect
   (e) Hold CAS (for hold with manual termination)

Vertical Speed Target:

Not Applicable

Descent/Approach Profile:

Not Applicable

Vertical Guidance Operational Procedure: Cruise

Objectives/Strategy:

Earth-referenced level flight at the Vertical Flightplan Cruise Flight-level

Engagement Criteria:

The Operational Procedure shall be engaged for any of the following Engagement Scenarios:

(a) Acquisition of Level - Aircraft is capturing or maintaining the Vertical Flightplan Cruise Flight-level Integrated Pitch/Thrust Control Mode:

The Pitch/Thrust Control Mode shall be selected according to the following Control Mode Scenarios:

(a) Acquisition of Level - Altitude Capture/Speed
(b) Maintaining Level - Altitude Hold/Speed Altitude Target:

The Altitude Target shall be selected according to the following Altitude Scenarios:

(a) Level at Cruise Flight Level - Vertical Flightplan Cruise Flight-level.

Speed Target:

The Airspeed Target and Mach Target shall be selected according to the following Speed Scenarios:

(a) Econ Cruise CAS/Mach Schedule
(b) Max Endurance CAS
(c) Edit Cruise CAS/Mach Schedule
(d) IAS/Mach Select/Preselect
(e) Hold CAS (for hold with manual termination)

Vertical Speed Target:
Not Applicable

Descent/Approach Profile:

Not Applicable

Vertical Guidance Operational Procedure: Profile-Descent

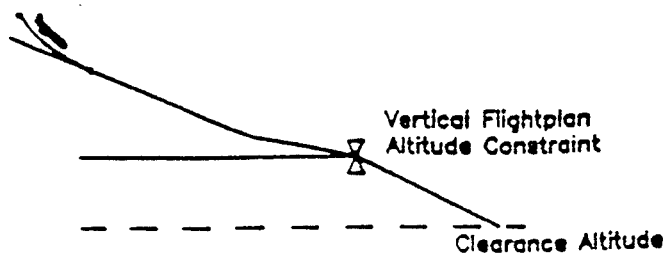

Objectives/Strategy:

Earth-referenced descent on FMS computed Descent/Approach Profile

Engagement Criteria:

The Operational Procedure shall be engaged for any of the following Engagement Scenarios:

(a) Acquisition of Descent/Approach Profile - Aircraft captures and maintains the profile

Integrated Pitch/Thrust Control Mode:

The Pitch/Thrust Control Mode shall be selected according to the following Control Mode Scenarios:

(a) Idle-thrust Segments on Descent/Approach Profile - Descent/Approach Profile/Idle-Thrust
(b) Speed Control Segments on Descent/Approach Profile - Descent/Approach Profile/Speed

Altitude Target:

The Altitude Target shall be selected according to the following Altitude Scenarios:

(a) Descend to Clearance Altitude
(b) Descend to Vertical Flightplan Altitude Constraint

Speed Target:

The Airspeed Target and Mach Target shall be selected according to the following Speed Scenarios:

(a) Descent/Approach Profile CAS/Mach Schedule (Econ or Edit speeds)

Vertical Speed Target:

Not Applicable

Descent/Approach Profile:

An earth-referenced Flight Path Angle shall be computed to dynamically control the aircraft to the trajectory of the FMS computed Descent/Approach Profile

Vertical Guidance Operational Procedure: Descent Intermediate Level

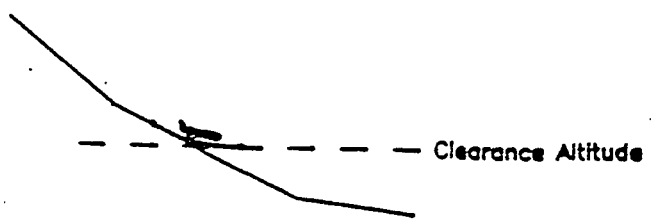

Objectives/Strategy:

Earth-referenced level flight at the Clearance Altitude or Vertical Flightplan Altitude Constraint

Engagement Criteria:

The Operational Procedure shall be engaged for any of the following Engagement Scenarios:

(a) Acquisition of Level - Aircraft is capturing or maintaining level flight

Integrated Pitch/Thrust Control Mode:

The Pitch/Thrust Control Mode shall be selected according to the following Control Mode Scenarios:

(a) Acquisition of Level - Altitude Capture/Speed
(b) Maintaining Level - Altitude Hold/Speed

Altitude Target:

The Altitude Target shall be selected according to the following Altitude Scenarios:

(a) Level at Clearance Altitude
(b) Level at Vertical Flightplan Altitude Constraint

Speed Target:

The Airspeed Target and Mach Target shall be selected according to the following Speed Scenarios:

(a) Descent/Approach Profile CAS/Mach Schedule (Econ or Edit speeds)
(b) Max Descent CAS
(c) IAS/Mach Select/Preselect
(d) Hold CAS (for hold with manual termination)

Vertical Speed Target:

Not Applicable

Descent/Approach Profile:

Not Applicable

Vertical Guidance Operational Procedure: Late Descent

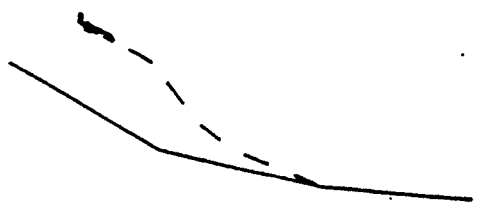

Objectives/Strategy:

Airmass-referenced descent with automated speed selection and airbrake brake extension to return the aircraft to the Descent/Approach Profile

Engagement Criteria:

The Operational Procedure shall be engaged for any of the following Engagement Scenarios:

(a) Aircraft Long - Aircraft is located above (and long of) the Descent/Approach Profile.

Integrated Pitch/Thrust Control Mode:

The Pitch/Thrust Control-mode shall be selected according to the following Control-mode Scenarios:

(a) Return to Profile - Speed/Idle-Thrust

Altitude Target:

The Altitude Target shall be selected according to the following Altitude Scenarios:

(a) Descend to Clearance Altitude.
(b) Descend to Vertical Flightplan Altitude Constraint.

Speed Target:

The Airspeed Target and Mach Target shall be selected according to the following Speed Scenarios:

(a) Unconstrained Descent - Descent/Approach Profile CAS/Mach Speed Schedule + X knots
(b) Speed Constrained Descent - Descent/Approach Profile CAS/Mach Speed Schedule
(c) Altitude Constrained - Vmax

Vertical Speed Target:

Not Applicable

Descent/Approach Profile:

Not Applicable

Vertical Guidance Operational Procedure: Early Descent

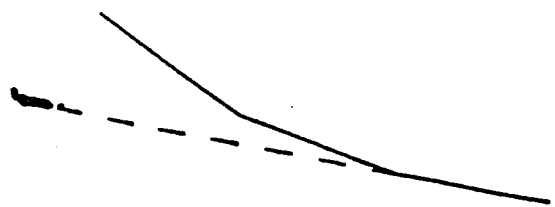

Objectives/Strategy:

Airmass-referenced descent.

Engagement Criteria:

The Operational Procedure shall be engaged for any of the following Engagement Scenarios:

(a) Aircraft Short - Aircraft is located below (and short of) the Descent/Approach Profile.

Integrated Pitch/Thrust Control Mode:

The Pitch/Thrust Control-mode shall be selected according to the following Control-mode Scenarios:

(a) Vertical Speed Mode Selected - Vertical Speed/Speed
(b) Level Change Mode Selected - Speed/Idle-Thrust

Altitude Target:

The Altitude Target shall be selected according to the following Altitude Scenarios:

(a) Descend to Clearance Altitude.
(b) Descend to Vertical Flightplan Altitude Constraint.

Speed Target:

The Airspeed Target and Mach Target shall be selected according to the following Speed Scenarios:

(a) Descent/Approach Profile CAS/Mach schedule (Econ or Edit Speed)

Vertical Speed Target:

The Vertical Speed Target shall be selected according to the following Vertical Speed Scenarios:

(a) Vertical Speed - Pilot selected Vertical Speed Target ( on Flight Control Panel )

Descent/Approach Profile:

Not Applicable

Vertical Guidance Operational Procedure: Airmass-Descent

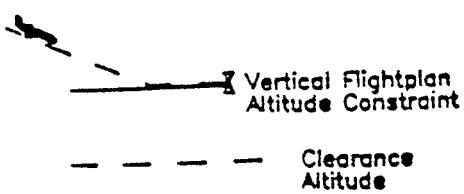

Objectives/Strategy:

Airmass-referenced Descent.

Engagement Criteria:

The Operational Procedure shall be engaged for any of the following Engagement Scenarios:

(a) Max Descent Mode Selected
(b) Vertical flightplan does not include a Descent/Approach Profile
(c) IAS/Mach Select/Preselect

Integrated Pitch/Thrust Control Mode:

The Pitch/Thrust Control-mode shall be selected according to the following Control-mode Scenarios:

(a) Vertical Speed Mode Selected - Vertical Speed/Speed
(b) Level Change Mode Selected - Speed/Idle-Thrust

Altitude Target:

The Altitude Target shall be selected according to the following Altitude Scenarios:

(a) Descend to Clearance Altitude
(b) Descend to Vertical Flightplan Altitude Constraint

Speed Target:

The Airspeed Target and Mach Target shall be selected according to the following Speed Scenarios:

(a) Econ Descent CAS/Mach Schedule
(b) Edit Descent CAS/Mach Schedule
(c) Max Descent CAS
(d) IAS/Mach Select/Preselect
(e) Hold CAS (for hold with manual termination)

Vertical Speed Target:

The Vertical Speed Target shall be selected according to the following Vertical Speed Scenarios:

(a) Vertical Speed - Pilot selected Vertical Speed Target ( on Flight Control Panel )

Descent/Approach Profile:

Not Applicable

APPENDIX- B

Logical Equations of the Control Law for Engagement Criteria

Vertical Guidance Operational Procedure=: Takeoff/Go Around ( Flightphase in [ Takeoff ] ) AND
( Aircraft Altitude > 400 ft ) AND
( Aircraft Altitude < Acceleration Altitude ) AND
( ( ( Aircraft Altitude < Altitude Target ) AND
    ( Aircraft not acquiring or maintaining Level Altitude Target ) ) OR
  ( ( Aircraft Altitude < Altitude Target ) AND
    ( Aircraft acquiring or maintaing Level Altitude Target ) AND
    ( Level Altitude Target has been raised ) ) ) .

\* Aircraft is in ascending flight \*

Vertical Guidance Operational Procedure=: Climb ( Flightphase in [ Climb ] ) AND
( Aircraft Altitude > Acceleration Altitude ) AND
( ( ( Aircraft Altitude < Altitude Target ) AND
    ( Aircraft not acquiring or maintaining Level Altitude Target ) ) OR
  ( ( Aircraft Altitude < Altitude Target ) AND
    ( Aircraft acquiring or maintaining Level Altitude Target ) AND
    ( Level Altitude Target has been raised ) ) )

\* Aircraft is in ascending flight \*

Vertical Guidance Operational Procedure=: Climb Intermediate Level ( Flightphase in [ Takeoff or Climb ] ) AND
( Aircraft acquiring or maintaining Level Altitude Target ) AND
( Level Altitude Target =/= Cruise Flightlevel )

Vertical Guidance Operational Procedure =: Cruise ( Flightphase in [ Cruise ] ) AND
( Aircraft acquiring or maintaining Level Altitude Target ) AND
( Level Altitude Target = Cruise Flightlevel )

Vertical Guidance Operational Procedure =: Profile-Descent ( Flightphase in [ Descent or Approach ] ) AND
( Aircraft acquiring or maintaining Descent/Approach Path Profile ) AND
( ( ( Aircraft Altitude > Altitude Target ) AND
    ( Aircraft not acquiring or maintaining Level Altitude Target ) OR
  ( ( Aircraft Altitude > Altitude Target ) AND
    ( Aircraft acquiring or maintaing Level Altitude Target ) AND
    ( Level Altitude Target has been lowered ) ) ) AND
( Vertical Flightplan includes a Descent/Approach Profile )

\* Aircraft is in descending flight \*

Vertical Guidance Operational Procedure =: Descent Intermediate Level ( Flightphase in [ Descent or Approach ] ) AND
( Aircraft acquiring or maintaining Level Altitude Target ) AND
( Level Altitude Target =/= Cruise Flightlevel )

Vertical Guidance Operational Procedure =: Late Descent
_____

( Flightphase in [ Descent or Approach ] ) AND
( Aircraft not acquiring or maintaining Descent/Approach Profile ) AND
( Aircraft Altitude > Descent/Approach Profile based on Distance to Destination ) AND
( ( ( Aircraft Altitude > Altitude Target ) AND                        * Aircraft is in descending flight *
    ( Aircraft not acquiring or maintaining Level Altitude Target ) OR
  ( ( Aircraft Altitude > Altitude Target ) AND
    ( Aircraft acquiring or maintaing Level Altitude Target ) AND
    ( Level Altitude Target has been lowered ) ) ) AND
( Vertical Flightplan includes a Descent/Approach Profile )

Vertical Guidance Opertional Procedure =: Early Descent
_____

( Flightphase in [ Descent or Approach ] ) AND
.( Aircraft not acquiring or maintaining Descent/Approach Profile ) AND
( Aircraft Altitude < Descent/Approach Profile based on Distance to Destination ) AND
( ( ( Aircraft Altitude > Altitude Target ) AND                        * Aircraft is in descending flight *
    ( Aircraft not acquiring or maintaining Level Altitude Target ) OR
  ( ( Aircraft Altitude > Altitude Target ) AND
    ( Aircraft acquiring or maintaing Level Altitude Target ) AND
    ( Level Altitude Target has been lowered ) ) ) AND
( Vertical Flightplan includes a Descent/Approach Profile )

Vertical Guidance Operational Proceure =: Airmass-Descent
_____

( Flightphase in [ Descent or Approach ] ) AND
( ( ( Aircraft Altitude > Altitude Target ) AND                        * Aircraft is in descending flight *
    ( Aircraft not acquiring or maintaining Level Altitude Target ) OR
  ( ( Aircraft Altitude > Altitude Target ) AND
    ( Aircraft acquiring or maintaing Level Altitude Target ) AND
    ( Level Altitude Target has been lowered ) ) ) AND
( Vertical Flightplan does not include a Descent/Approach Profile )

What is claimed is:

1. In an aircraft having a Flight Management System, the Flight Management System including a plurality of inputs for controlling the lateral position of the aircraft to a desired lateral position along a desired flightplan, the Flight Management System further including an apparatus for controlling the aircraft along a vertical profile of the desired flightplan, said apparatus comprising:
 a) means for providing information denoting actual vertical position of said aircraft;
 b) means for generating information specifying a desired vertical position of said aircraft along the vertical profile of the predetermined desired flightplan;
 c) logic means, operatively connected to said means for providing and to said means for generating, for processing said actual vertical position and said desired vertical position in accordance with predefined decision construct control laws to determine a value for each of a predetermined number of real-time target signals, wherein the decision construct control laws includes a plurality of sets of scenarios, and wherein each set of scenario includes a predetermined number of procedures associated with said scenarios, the predetermined number of procedures including:
  a) takeoff scenario,
  b) climb scenario,
  c) climb intermediate scenario,
  d) cruise scenario,
  e) profile decent scenario,
  f) descent intermediate level scenario,
  g) late descent scenario,
  h) early descent scenario, and
  i) airmass descent scenario; and
 d) control means, operatively connected to said logic means to receive said predetermined number of real-time target signals, for controlling at least one control element of said aircraft, the control elements causing the aircraft to move in the vertical plane, such that the apparatus coordinates the control of said control elements, thereby controlling the vertical profile of the flight-plan.

2. An apparatus for controlling the aircraft along a vertical profile according to claim 1, wherein the decision construct control laws includes five sets of scenarios.

3. An apparatus for controlling the aircraft along a vertical profile according to claim 2, where said five sets of scenarios include:
 a) an engagement control law,
 b) an altitude control law,
 c) a speed control law,
 d) a control mode law, and
 e) a vertical speed control law 4. An apparatus for controlling the aircraft along a vertical profile according to claim 3, wherein the predetermined number of real-time target signals include:
at least one control signal, and at least one real-time target signal.

5. An apparatus for controlling the aircraft along a vertical profile according to claim 4, wherein the real-time target signals have information associated therewith to indicate settings for the control elements.

6. An apparatus for controlling the aircraft along a vertical profile according to claim 5, wherein the control signal identifies to the control means a component each of said control elements is required to control.

7. An apparatus for controlling the aircraft along a vertical profile according to claim 6, wherein the real-time target signals outputted from said logic means include:
 a: airspeed/mach target,
 b: altitude target,
 c: descent/approach path target,
 d: vertical speed target, and
 e: control mode signal.

8. An apparatus for controlling the aircraft along a vertical profile according to claim 7, wherein the control means comprises:
 a: autopilot/autothrottle means;
 b: means for providing thrust to said aircraft; and
 c: control surface means for controlling pitch of said aircraft.

9. An apparatus for controlling the aircraft along a vertical profile according to claim 8, wherein said control surface means comprise an elevator of said aircraft.

10. An apparatus for controlling the aircraft along a vertical profile according to claim 9, wherein the generation of the real-time target signals is performed essentially in parallel by said logic means.

* * * * *